(12) United States Patent
Odashima et al.

(10) Patent No.: US 6,650,970 B2
(45) Date of Patent: Nov. 18, 2003

(54) INFORMATION PROVIDING APPARATUS FOR ENGINE-EQUIPPED MOBILE BODY

(75) Inventors: Masahiro Odashima, Kawagoe (JP); Tadamasa Yamanaka, Kawagoe (JP); Koji Sakuma, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/972,040

(22) Filed: Oct. 9, 2001

(65) Prior Publication Data

US 2002/0045973 A1 Apr. 18, 2002

(30) Foreign Application Priority Data

Oct. 18, 2000 (JP) ......................................... 2000-318268

(51) Int. Cl.[7] ............................................. H04L 12/00
(52) U.S. Cl. ........................................................ 701/1
(58) Field of Search ...................... 701/1, 200; 709/203

(56) References Cited

U.S. PATENT DOCUMENTS 6,073,075 A * 6/2000 Kondou et al. ............. 701/203
6,208,932 B1 * 3/2001 Ohmura et al. ............. 701/200
6,484,093 B1 * 11/2002 Ito et al. ...................... 701/211

FOREIGN PATENT DOCUMENTS

EP  0 706 295 A2   4/1996
EP  1 011 280 A1   6/2000

OTHER PUBLICATIONS

Pat Kennedy, "MOBILEWEB™ Changing the Face of Mobile Networking Through Universal Wireless Connectivity," IEEE Technical Application Conference Northcon 96, Northcon Conference Record, pp. 89–94 (Nov. 4 1996).

* cited by examiner

*Primary Examiner*—Michael J. Zanelli
(74) *Attorney, Agent, or Firm*—Morgan, Lewis & Bockius LLP (57) ABSTRACT

An information providing apparatus includes a terminal device in a mobile body for transmitting an information request signal and an information providing device for transmitting information data to the terminal device in response to the information request signal. The information request signal is issued in response to an operation of starting the mobile body's engine.

9 Claims, 11 Drawing Sheets

(USER INFORMATION AREA)

| CELLULAR PHONE NO. | GENRE | CONTRACT PERIOD |
|---|---|---|
| XXX-YYYY-ZZZZ | SPORTS | 1/25 – 6/25 |
| YXX-ZZZZ-ZZYY | WEATHER | 2/10 – 7/10 |
| ZZZ-YYZY-ZYYZ | SPORTS | 6/2 – 9/2 |
| XYX-YXYY-ZXXZ | POLITICS | 8/8 – 12/8 |
| XYX-YXZZ-ZXXZ | ENTERTAINMENT | 7/8 – 11/8 |

FIG. 5

(URL INFORMATION AREA)

| GENRE | URL |
|---|---|
| NEWS | http://www.&&&.co.jp./news/ |
| POLITICS | http://www.???.co.jp./seiji/ |
| ECONOMY | http://www.%%%.co.jp./keizai/ |
| SPORTS | http://www.¥¥¥.co.jp./sports/ |
| ENTERTAINMENT | http://www.¥$$.co.jp./geinou/ |
| WEATHER | http://www.¥$$.co.jp./tenki/ |

FIG. 3

| |
|---|
| USER INFORMATION AREA |
| URL INFORMATION AREA |
| 1ST TIME-PERIOD INFORMATION STORAGE AREA |
| 2ND TIME-PERIOD INFORMATION STORAGE AREA |
| 3RD TIME-PERIOD INFORMATION STORAGE AREA |

INFORMATION PROVIDING APPARATUS FOR ENGINE-EQUIPPED MOBILE BODY

BACKGROUND OF THE INVENTION

1. Field of the Invention

The present invention relates to an information providing apparatus for providing a mobile body having an engine such as an automobile, with information.

2. Description of the Related Art

In recent years, it is possible to obtain various information even within a moving vehicle by connecting to the Internet from a cellular phone or the like.

In order to obtain desired information via the Internet, the user has to input a URL (Uniform Resource Locator) of a site that provides the information or a search key word using a web browser.

It is, however, troublesome for a driver of the vehicle to perform operations other than driving to only acquire the desired information.

OBJECT AND SUMMARY OF THE INVENTION

The present invention has been developed in order to overcome the above described problem, and it is an object of the present invention to provide an information providing apparatus suited for an engine-equipped mobile body that can easily obtain desired information.

According to the present invention, there is provided an information providing apparatus for providing mobile bodies with various information data, the respective mobile body having an engine, the information providing apparatus comprising a terminal device located in or on the respective mobile body for transmitting an information request signal in response to an operation of starting the engine of the respective mobile body, and an information providing device for transmitting information data to the respective mobile body's terminal device upon receiving the information request signal.

DETAILED DESCRIPTION OF THE PREFERRED EMBODIMENTS

Embodiments of the present invention will now be described in reference to the accompanying drawings.

Figure 1:
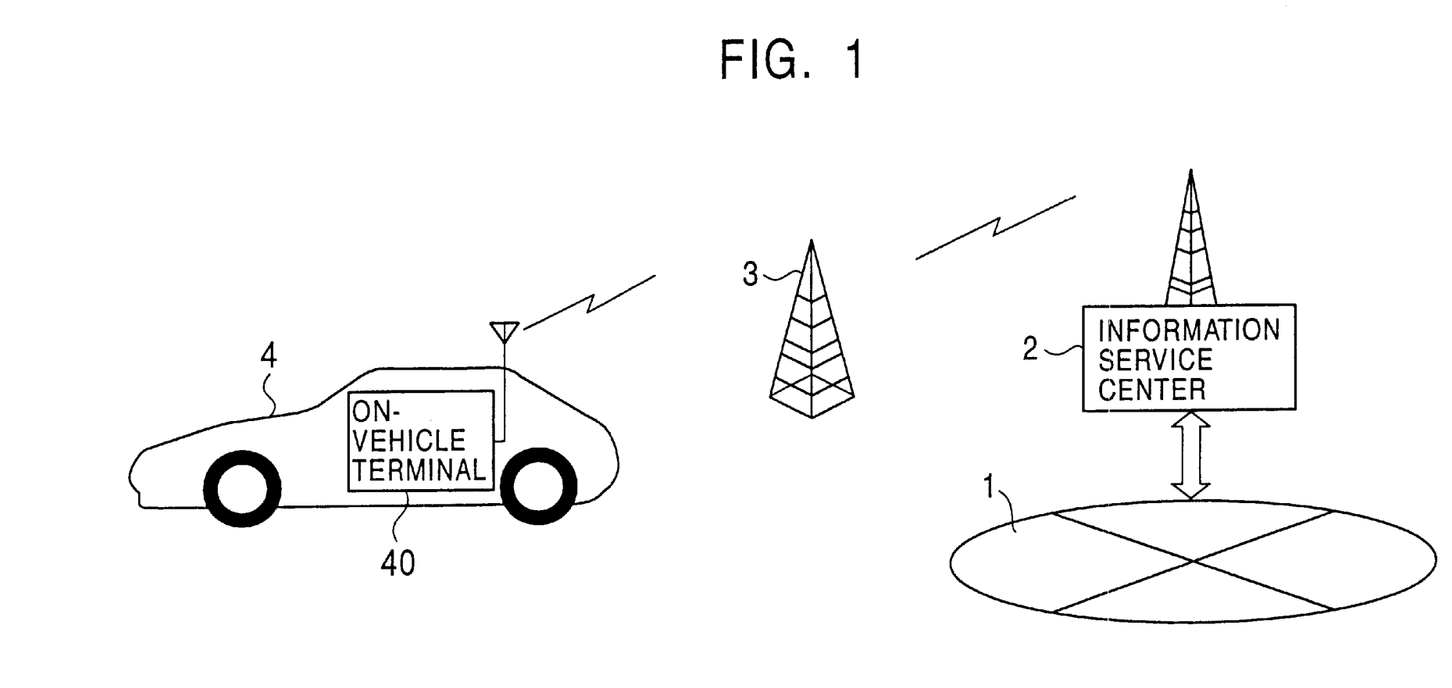
FIG. 1 illustrates a communication system including an information providing apparatus for an engine-equipped mobile body according to the present invention.

Referring to FIG. 1, illustrated is a communication system that utilizes an information providing apparatus suited for an engine-equipped mobile body according to the present invention.

The communication system includes an information service center 2 connected to the Internet 1, a plurality of relay stations 3 located in the respective areas, and a plurality of vehicles 4 each of which carries an on-vehicle terminal device 40 having a data communication capability via a cellular phone network. Each of the vehicles 40 is an automobile equipped with a drive source such as an internal combustion engine or motor (hereinafter, referred to as "engine"). It should be noted that while only one vehicle is illustrated in the drawing, the system of the invention may include a plurality of vehicles. Each relay station 3 relays data to be communicated between each of the on-vehicle terminal devices 40 and the information service center 2, as will be described in detail later. The information service center 2 is administered by, for example, a cellular phone company and provides various information to only those on-vehicle terminal devices 40 which have contracted information service via the cellular phone network of that cellular phone company. This information provision is referred to as "information service" hereinafter.

Figure 2:
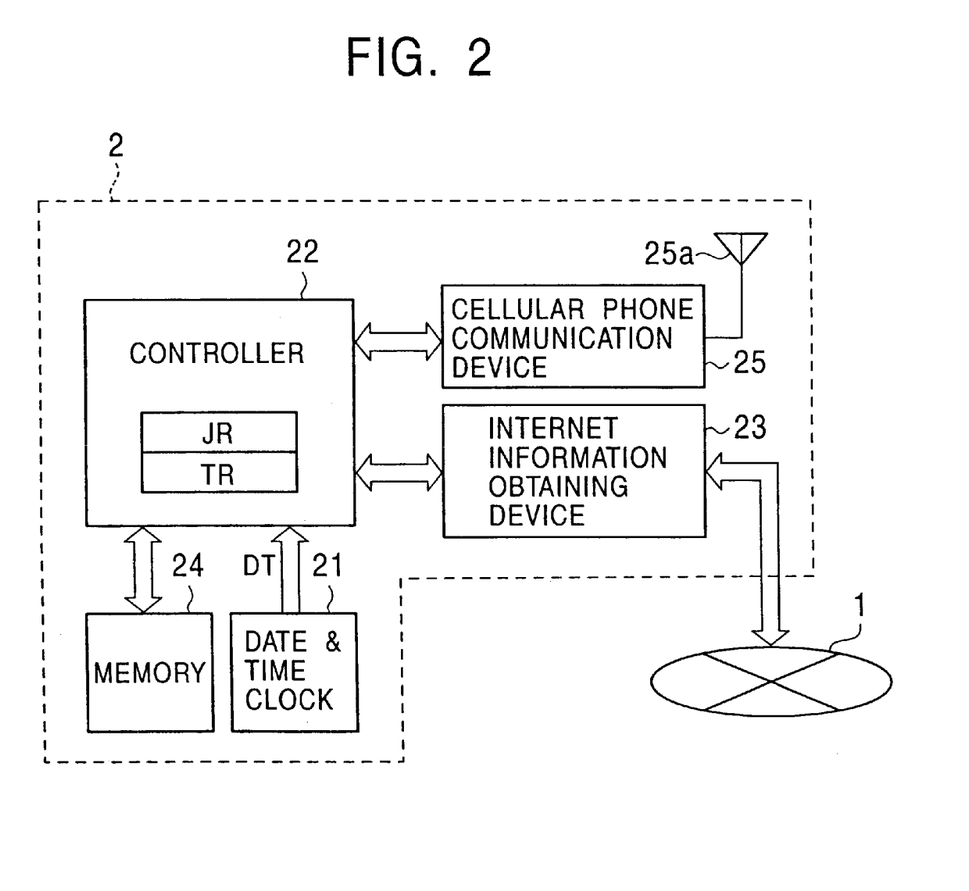
FIG. 2 illustrates a system arrangement inside an information service center.

Referring to FIG. 2, illustrated is a system configuration of the information service center 2.

Figure 3:
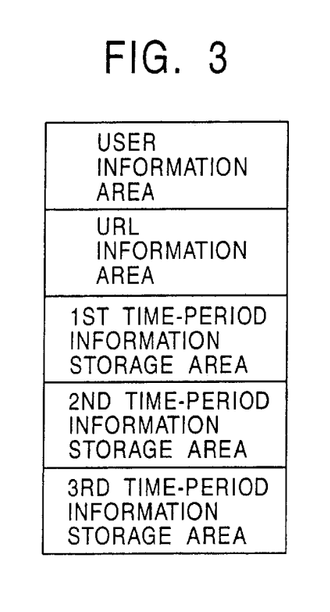
FIG. 3 illustrates a memory map in a memory.
Figure 4:
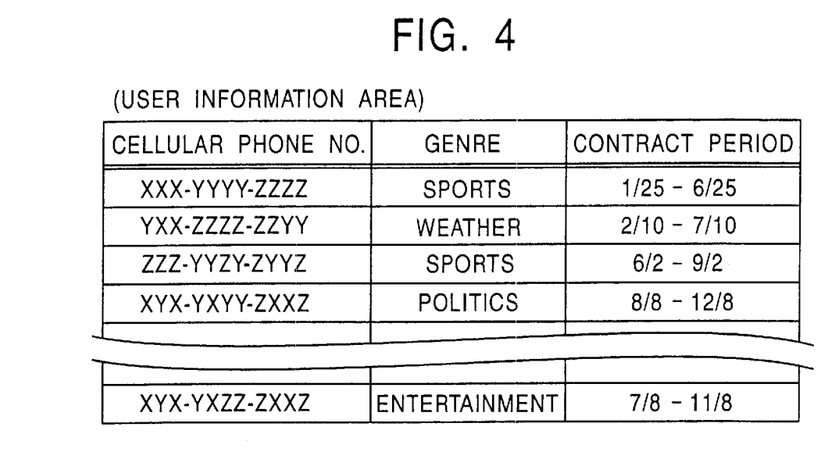
FIG. 4 illustrates exemplary contents memorized in a user information area of the memory.
Figure 5:
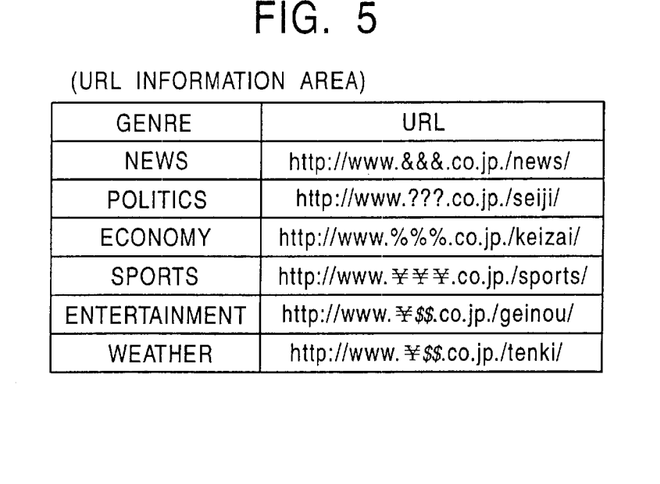
FIG. 5 illustrates exemplary contents memorized in a URL information area of the memory.

In this drawing, a date and time clock 21 measures the current date and time, and supplies the date and time information DT representing the current date and time to a controller 22. A Internet information obtaining device 23 for acquiring information from the Internet 1 accesses a site on the Internet on the basis of the URL fed from the controller 22, obtains information from the site, which is an information source or a provider, and supplies the information to the controller 22. As illustrated in FIG. 3, a memory 24 is divided into a user information area, a URL information area, a first time-period information storage area D1, a second time-period information storage area D2 and a third time-period information storage area D3. Referring to FIG. 4, in the user information area are registered cellular phone numbers of the on-vehicle terminal devices 40 that have contracted the information service, genre information that is specified by owners of the contracted on-vehicle terminal devices 40 beforehand respectively, and contract period information indicating contract periods such that one cellular phone number corresponds to one genre and associated contract period. The genre information is a genre of information which an owner of the on-vehicle terminal device 40 wants to have delivered, such as news, politics, economy, sports, entertainment and weather. Referring to FIG. 5, the URL information area memorizes Internet URLs for the respective genres that issue information related to the genres. A cellular phone communication device 25 receives various data signals transmitted from the on-vehicle terminal device 40 through an antenna 25a and transfers the received signals to the controller 22. As the cellular phone communication device 25 obtains information data and a cellular phone number from the controller 22, the cellular phone communication device 25 establishes an connection to the cellular phone network on the basis of the received cellular phone number and transmits the information data to the on-vehicle terminal device 40 by way of the antenna 25a. The controller 22 controls the date and time clock 21, the Internet information obtaining device 23, the memory 24 and the cellular phone communication device 25 respectively on the basis of diverse control programs as will be later described.

The terminal device 40 sends an information data request to the information service center 2, and receives information data from the information service center 2 and outputs the information content in the form of sound/voice and/or image.

Figure 6:
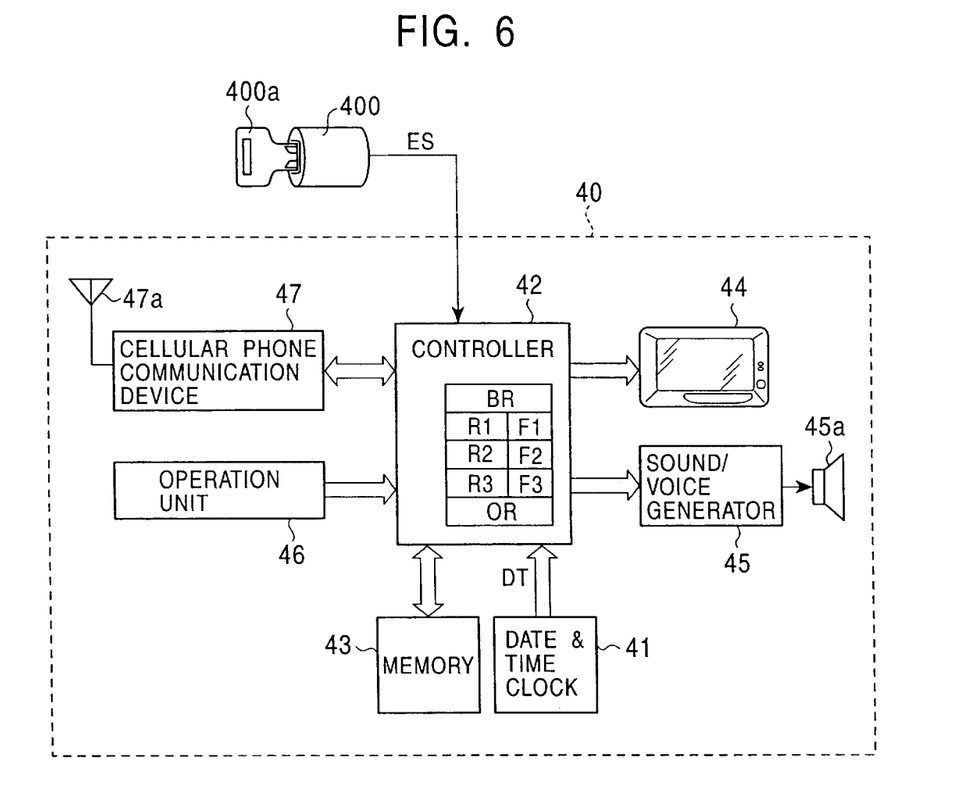
FIG. 6 illustrates an internal structure of an on-vehicle terminal device.

Referring to FIG. 6, depicted is an inside structure of the on-vehicle terminal device 40.

In FIG. 6, an ignition switch 400 in the vehicle 4 produces a start signal ES and feeds it to a controller 42 of the on-vehicle terminal device 40 when a driver turns an ignition key 400a to an accessory position to start an engine. A date and time clock 41 provides current date and time, and supplies date and time information DT representing the current date and time to the controller 42. A memory 43 stores various information data, which are supplied from the controller 42, and supplies the data to the controller 42 upon a retrieval command. A display unit 44 displays data, information, image, etc. according to image signals sent from the controller 42. A sound/voice generator 45 generates a sound/voice signal in accordance with text data sent from the controller 42, and causes a loudspeaker 45a to produce the corresponding sound/voice. An operation unit 46 is operated by a user to supply an operation signal to the controller 42. A cellular phone communication device 47 receives various data signals from the information service center 2 through antenna 47a and transfers the signals to the controller 42. Upon receiving an information request signal from the controller 42, the cellular phone communication device 47 establishes network connection to the information service center 2 and transmits the information request signal to the information service center 2 through the antenna 47a. The controller 42 controls the date and time counter 41, the memory 43, the display 44, the sound/voice generator 45, the operation unit 46 and the cellular phone communication device 47 in accordance with respective control programs as will be described.

An information providing operation conducted by the above-described system will now be described.

Figure 7:
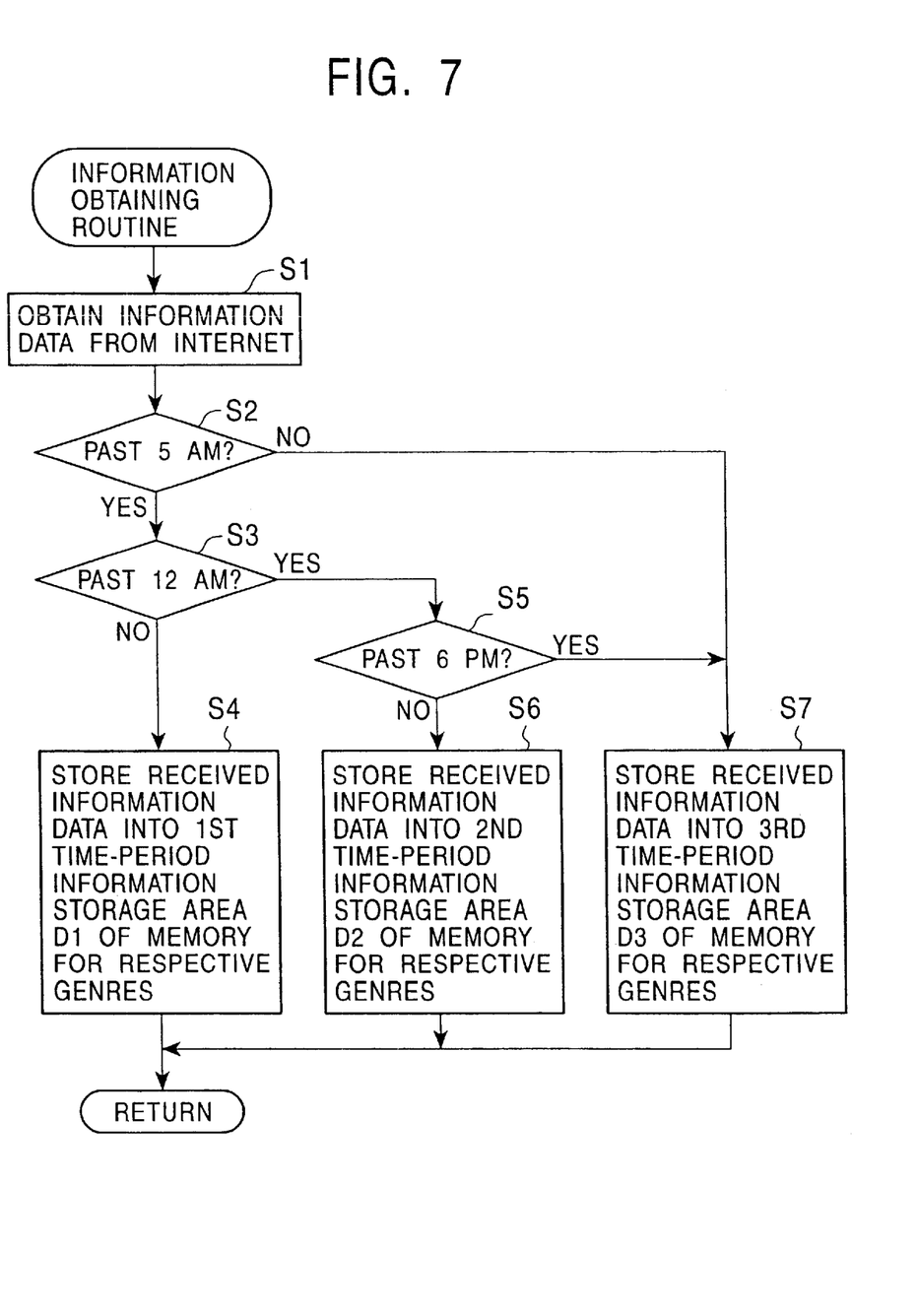
FIG. 7 illustrates a control routine for obtaining information.

The controller 22 in the information service center 2 repeatedly executes the control procedure at predetermined intervals or periodically in accordance with the information acquisition flowchart shown in FIG. 7.

In FIG. 7, the controller 22 first retrieves the URLs of the respective genres memorized in the URL information area of the memory 24 (FIG. 5), and supplies the URLs to the Internet information obtaining device 23 (Step S1). Upon execution of Step S1, the Internet information obtaining device 23 successively retrieves information data from the sites on the Internet 1 which are indicated by the supplied URLs. The controller 22 then determines whether the current time represented by the date and time information DT supplied from the date and time clock 21 is past 5 a.m., which is the start time of the first time period (e.g., 5 a.m. to 12 a.m.) (Step S2). If it is determined at Step S2 that the current time is past 5 a.m., the controller 22 then determines whether the current time is past 12 a.m., which is the start time of the second time period (e.g., 12:00 to 18:00) (Step S3). If it is determined at Step S3 that the current time is not past 12 a.m., the controller 22 categorizes the information data, which has been retrieved through the Internet information obtaining device 23, into the respective genres to memorize the categorized data in the first time-period information storage area D1 of the memory 24 as shown in FIG. 3 (Step S4). If, on the other hand, it is determined at Step S3 that the current time is past 12 a.m., the controller 22 determines whether the current time is past 18:00, which is the start time of the third time period (e.g., 18:00 to 5:00) (Step S5). If it is determined at Step S5 that the current time is not past 18:00 (6 p.m.), the controller 22 categorizes the information data, which has been retrieved through the Internet information obtaining device 23, into the respective genres and memorizes the categorized data in the second time-period information storage area D2 of the memory 24 as shown in FIG. 3 (Step S6). If, on the other hand, it is determined at Step S5 that the current time is past 18:00, the controller 22 categorizes the information data, which has been retrieved through the Internet information obtaining device 23, into the respective genres and memorizes the categorized data in the third time-period information storage area D3 of the memory 24 as shown in FIG. 3 (Step S7). When it is determined at Step S2 that the current time is not past 5 a.m., i.e., the start time of the first time period, the controller 22 executes Step S7. After executing Step S4, S6 or S7, the controller 22 exits the information obtaining routine of FIG. 7 and returns to a main control routine (not shown).

By repeatedly executing the above-described information obtaining routine at different periods of time, the information service center 2 is able to obtain the most recent information data of the respective genres from the sites on the Internet 1. The information service center 2 also categorizes or groups the information data in terms of the specific time period in which the user obtained the data, i.e., the first time period (5:00 to 12:00), second time period (12:00 to 18:00) and third time period (18:00 to 5:00), and stores the data in the first, second and third information storage areas D1, D2 and D3 of the memory 24 respectively as shown in FIG. 3.

In the meantime, when the owner of the on-vehicle terminal device 40 completes the information service contract, the information service center 2 reads the contract period information, which can be found out on the basis of the cellular phone number of the on-vehicle terminal device 40, from the user information area of the memory 24 as shown in FIG. 4, and sends the information to the on-vehicle terminal device 40. The controller 42 of the on-vehicle terminal device 40 stores the contract period information, which has been received by the cellular phone communication device 47, into a contract content register BR. After that, the controller 42 conducts the initial setting as will be described below. The controller 42 stores time information of 5 a.m. into a first time-period register R1 to specify the start time of the first time period, time information of 12 a.m. into a second time-period register R2 to specify the start time of the second time period, and time information of 18:00 into a third time-period register R3 to specify the start time of the third time period. As a result, the first time period is set to 5 a.m. to 12 a.m., the second time period is set to 12 a.m. to 18:00, and the third time period is set to 18:00 to 5 a.m. The controller 42 then stores "0" (zero), which is the logic level indicating no information data acquisition, in each of a first flag register F1 designed to indicate whether the information data has been obtained or not within the first time period, a second flag register F2 designed to indicate whether the information data has been obtained or not within the second time period, and a third flag register F3 designed to indicate whether the information data has been obtained or not within the third time period. The controller 42 sets an output-mode-1 to an information output-mode register OR. The output-mode-1 is a mode to output the information data by means of sound/voice and image. The information output-mode register OR determines a output form of the information data. In this embodiment, the modes for the information data output methods include the above described output-mode-1, an output-mode-2 to only provide image presentation, and an output-mode-3 to only provide a sound/voice. The user can switch the setting of the information output-mode register OR from the output-mode-1 to the output-mode-2 (or to the output-mode-3) by operating the operation device 46.

When the driver turns the ignition key 400a to the accessory position to start the engine of the vehicle 4, the ignition switch 400 issues the start signal ES to the controller 42 of the terminal device 40 of the vehicle 4. The controller 42 executes an information request control routine as shown in FIG. 8 in response to the start signal ES.

Figure 8:
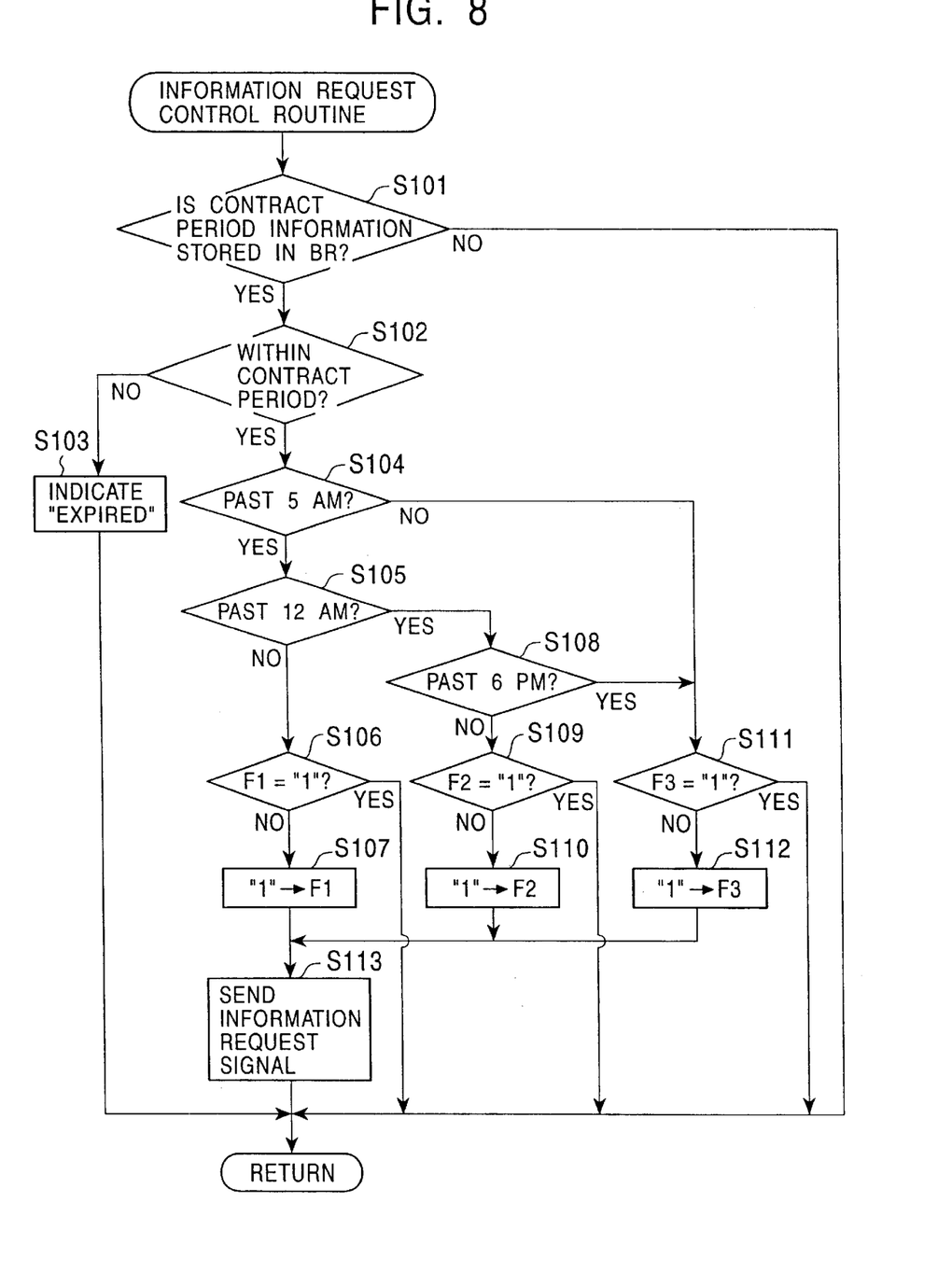
FIG. 8 illustrates a control routine for requesting information.

In FIG. 8, the controller 42 determines whether or not the contract period information is stored in the contract content register BR (Step S101). If it is determined at Step S101 that the contract period information is stored, i.e., the information service contract is already made, the controller 42 determines whether the current date represented by the date and time information DT supplied from the date and time clock 41 is within the contract period represented by the contract period information (Step S102). If it is determined at Step S102 that the current date is not within the contract period, the controller 42 issues an image signal to the display unit 44 to inform that the contract period has expired (Step S103). Upon receiving the signal, the display unit 44 indicates an message such as "The contract period for the information service has expired!" After Step 103, or if it is determined at Step S101 that the contract period information is not stored in the contract content register BR, the controller 42 exits the information request routine and returns to the main control routine.

If, on the other hand, it is determined at Step S102 that the today's date is within the contract period, the controller 42 determines whether the current time represented by the date and time information DT given from the date and time clock 41 is past 5 a.m. which is stored in the first time-period register R1 (Step S104). If it is determined at Step S104 that the current time is past 5 a.m., the controller 42 determines whether the current time is past 12 a.m. which is stored in the second time-period register R2 (Step S105).

If Step S105 determines that the current time is not past 12 a.m., the controller 42 determines whether the logic level of the first flag register F1 is "1". In other words, the controller 42 determines whether the information data acquisition is complete within the first time period (5 a.m. to 12 a.m.) (Step S106). If Step S106 determines that the logic level of the first flag register F1 is not "1", i.e., that the information data has not been obtained in the first time period, the controller 42 changes the logic level of the first flag register F1 to "1" (Step S107).

If it is determined at Step S105 that the current time is past 12 a.m. stored in the second time-period register R2, the controller 42 then determines whether the current time is past 18:00 stored in the third time-period register R3 (Step S108). If it is determined at Step S108 that the current time is not past 18:00, the controller 42 determines whether the logic level of the second flag register F2 is "1". In other words, the controller 42 determines whether the information data acquisition is complete within the second time period (12 a.m. to 18:00) (Step S109). If it is determined at Step S109 that the logic level of the second flag register F2 is not "1", i.e., that the information data has not been obtained in the second time period, the controller 42 changes the logic level of the second flag register F2 to "1" (Step S110).

If it is determined at Step S108 that the current time is past 18:00 stored in the third time-period register R3, the controller 42 then determines whether the logic level of the third flag register F3 is "1". In other words, the controller 42 determines whether the information data acquisition is complete within the third time period (18:00 to 5 a.m.) (Step S111). If it is determined that the current time is not past 5 a.m. stored in the first time-period register R1, the controller 42 also executes Step S111. If it is determined at Step S111 that the logic level of the third flag register F3 is not "1", i.e., the information data has not been obtained in the third time period, the controller 42 changes the logic level of the third flag register F3 to "1" (Step S112).

After executing Step S107, S110 or S112, the controller 42 controls the cellular phone communication device 47 to send an information request signal to the information service center 2 (Step S113). The cellular phone communication device 47 therefore establishes the line connection to the information service center 2 and sends the information request signal to the information service center 2. After Step S113, the controller 42 exits the information request routine of FIG. 8 and returns to the main control routine (not shown). In the main control routine, the controller 42 determines as occasion arises whether the current time represented by the date and time information DT sent from the date and time clock 41 reaches 12 a.m. When the current time becomes 12 a.m., the controller 42 initializes each of the first to third flag registers F1 to F3 to the logic level "0". The logic level "0" represents no information data acquisition.

As described above, the information request routine shown in FIG. 8 is performed when the driver turns the ignition key 400a to start the engine of the vehicle 4. Consequently, the on-vehicle terminal device 40 transmits the information request signal to the information service center 2 to request the information data. In this embodiment, the on-vehicle terminal device 40 sends the information request signal to the information service center 2 in response to only the first ignition key operation within each of the time periods (first to third time periods) in that day or that 24 hours. Specifically, once the on-vehicle terminal device 40 sends the information request signal, the device 40 does not send the information request signal for the second time within the same time period even if the driver operates the ignition key again. In other words, the information request signal is transmitted only once within each time period regardless of how many times the ignition key is operated during that time period.

Figure 9:
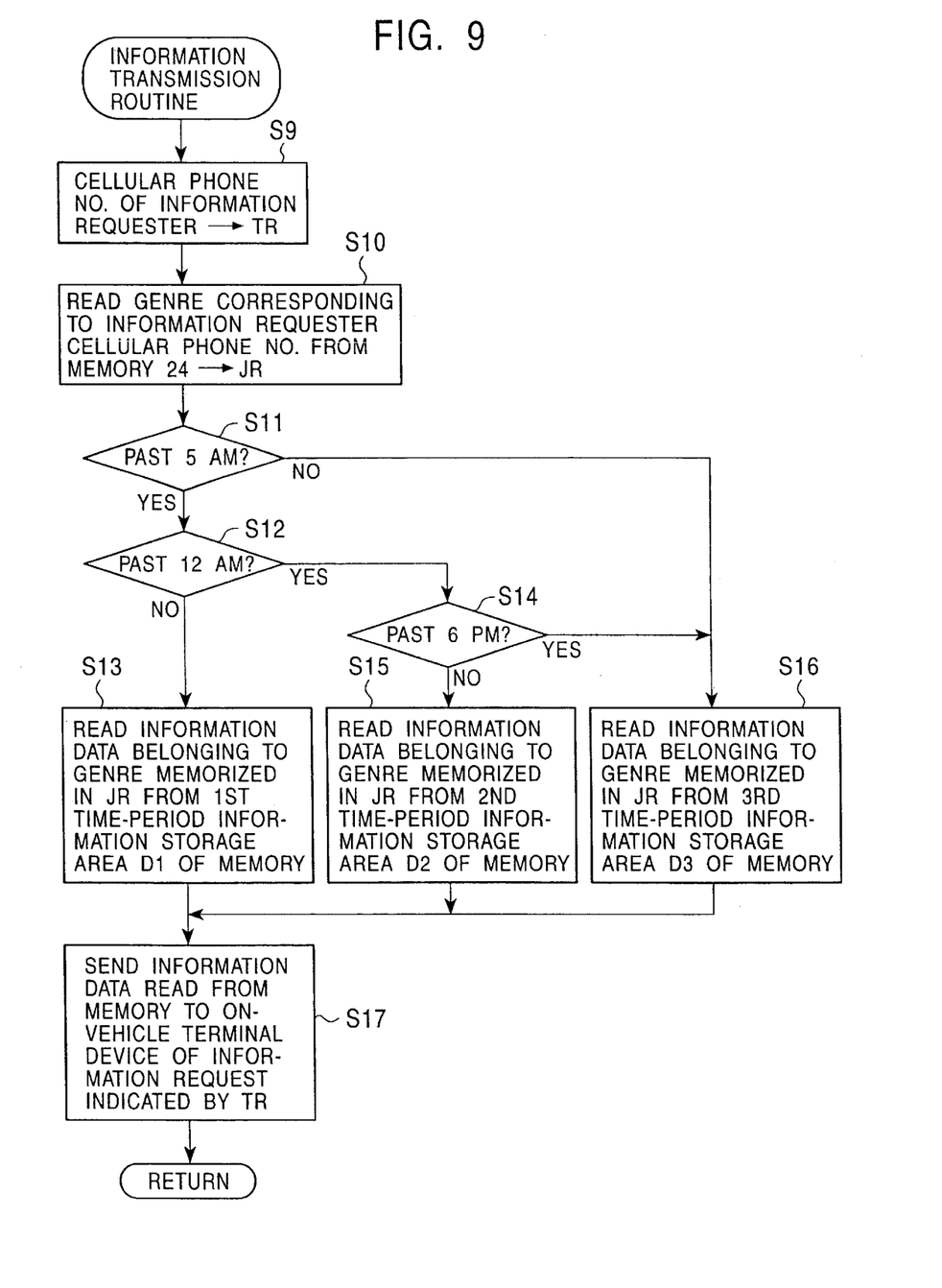
FIG. 9 illustrates a control routine for transmitting information.

As the cellular phone communication device 25 of the information service center 2 receives the information request signal from the on-vehicle terminal device 40, the controller 22 of the information service center 2 carries out an information transmission routine shown in FIG. 9.

Referring to FIG. 9, the controller 22 first stores a cellular phone number of the information request signal sending party (i.e., the information requester, or the on-vehicle terminal device 40) in a telephone number register TR (Step S9). Subsequently the controller 22 reads the genre information that corresponds to the cellular phone number of the information requester from the user information area of the memory 24 shown in FIG. 4, and stores the genre information in a genre register JR (Step S10). The controller 22 then determines whether the current time represented by the date and time information DT supplied from the date and time clock 21 is past 5 a.m., which is the start time of the first time period (Step S11).

If it is determined at Step S11 that the current time is past 5 a.m., the controller 22 determines whether the current time is past 12 a.m., which is the start time of the second time period (Step S12). If it is determined at Step S12 that the current time is not past 12 a.m., the controller 22 reads the information data belonging to the genre stored in the genre register JR from the first time-period information storage area D1 of the memory 24 shown in FIG. 3 (Step S13). If, on the other hand, it is determined at Step S12 that the current time is past 12 a.m., the controller 22 determines whether the current time is past 18:00, i.e., the start time of the third time period (Step S14). If it is determined at Step S14 that the current time is not past 18:00, the controller 22 reads the information data belonging to the genre stored in the genre register JR from the second time-period information storage area D2 of the memory 24 shown in FIG. 3 (Step S15). If, on the other hand, it is determined at Step S14 that the current time is past 18:00, the controller 22 reads the information data belonging to the genre stored in the genre register JR from the third time-period information storage area D3 of the memory 24 shown in FIG. 3 (Step S16). When Step S11 determines that the current time is not past 5 a.m., i.e., the start time of the first time period, the controller 22 also executes Step S16.

After Step S13, S15 or S16, the controller 22 supplies the information data retrieved from the first, second or third time-period information area D1, D2 or D3 of the memory 24 and the cellular phone number memorized in the telephone number register TR to the cellular phone communication device 25 (Step S17). As a result of executing Step S17, the cellular phone communication device 25 establishes the line connection to the supplied cellular phone number, and sends the information data to the on-vehicle terminal device 40 of this cellular phone number only. After Step S17, the controller 22 exits the information transmission routine shown in FIG. 9 and returns to the main control routine.

In this manner, the information transmission routine shown in FIG. 9 is carried out as the information request signal is transmitted from the on-vehicle terminal device 40. The information service center 2 then selects one of the first to third time-period information storage areas D1 to D3 in the memory 24 which corresponds to one of the time periods (first to third time periods) including the current time. The information service center 2 only reads the information data belonging to the genre specified beforehand by the information requesting party from the selected information storage area, and only transfers it to that on-vehicle terminal device 40 (i.e., the information requesting party).

In other words, the information service center 2 transmits the most recent information data related to a genre desired by a particular information requesting party to only the information requesting party (i.e., one of the on-vehicle terminal devices 40) in response to the information request from the particular on-vehicle terminal device 40.

Figure 10:
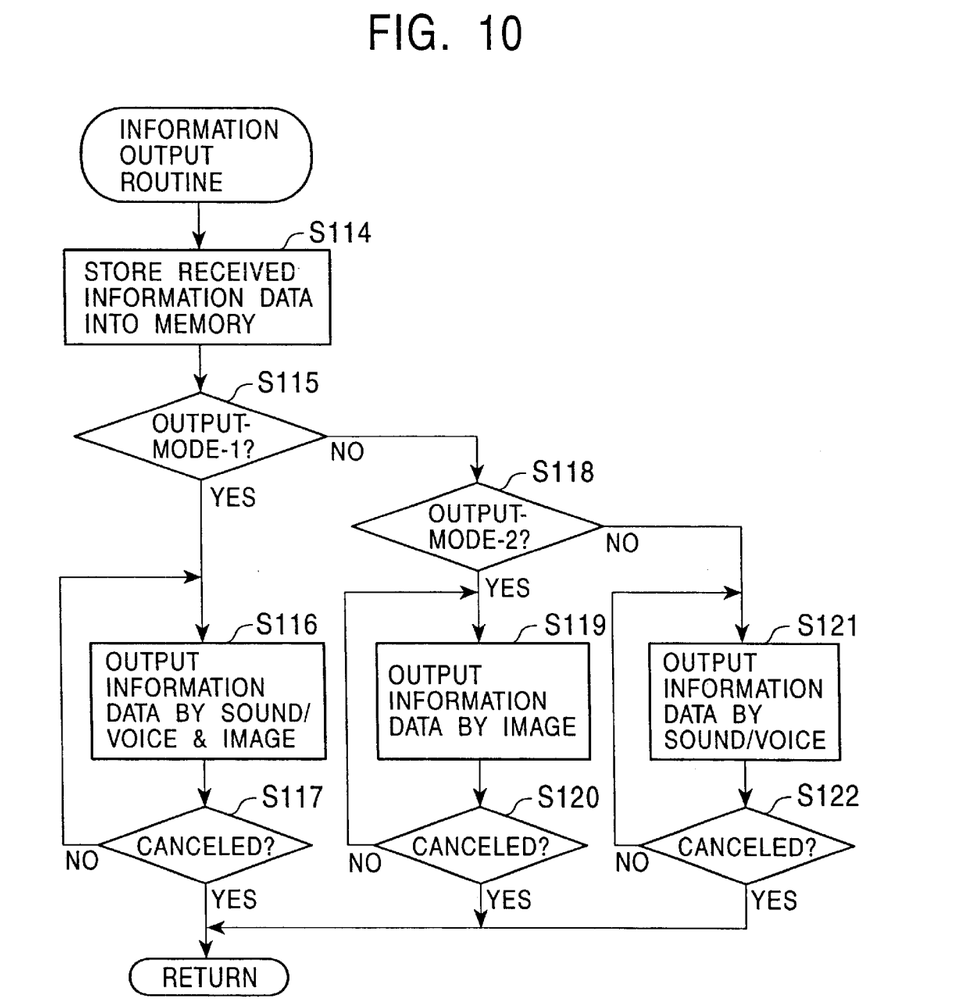
FIG. 10 illustrates a control routine for outputting information.

As the cellular phone communication device 47 of the on-vehicle terminal device 40 receives the information data from the information service center 2, the controller 42 of the on-vehicle terminal device 40 executes an information output routine as shown in FIG. 10.

As illustrated in FIG. 10, the controller 42 first stores the information data received by the cellular phone communication device 47 into the memory 43 (Step S114). Then, the controller 42 determines whether the output-mode memorized in the information output-mode register OR is the output-mode-1 to output the information data by means of image and sound/voice (Step S115). If it is determined at S115 that the output-mode-1 has been selected, the controller 42 produces an image signal representing the content of the information data stored in the memory 43 and feeds the signal to the display device 44 on one hand, and produces text data representing the same information data and feeds the data to the sound/voice generator 45 on the other hand (Step S116). The display device 44 thus indicates (displays) an image on the basis of the information data sent from the information service center 2. The sound/voice generator 45 outputs a sound and/or voice through the loudspeaker(s) 45a on the basis of the same information data. The controller 42 then determines whether the user operates the operation unit 46 to enter a cancellation command (Step S117). If it is determined at S117 that the cancellation command has not been entered, the controller 42 returns to Step S116 and repeats the image presentation and sound/voice generation in accordance with the information data.

If it is determined at S115 that the output-mode memorized in the information output-mode register OR is not the output-mode-1, the controller 42 determines whether the memorized output-mode is the output-mode-2 (Step S118). The output-mode-2 is a mode to output the information data by image only. If it is determined at S118 that the output-mode-2 has been selected, the controller 42 produces an image signal representing the content of the information data stored in the memory 43 and feeds the signal to the display device 44 (Step S119). The display device 44 thus displays an image on the basis of the information data sent from the information service center 2. The controller 42 then determines whether the user operates the operation unit 46 to enter a cancellation command (Step S120). If it is determined at S120 that the cancellation command has not been entered, the controller 42 returns to Step S119 to repeat the image presentation in accordance with the information data.

If it is determined at S118 that the output-mode memorized in the information output-mode register OR is not the output-mode-2, the controller 42 determines that the memorized output-mode is the output-mode-3. The output-mode-3 is a mode to output the information data by sound/voice only. The controller 42 produces text data representing the content of the information data stored in the memory 43 and supplies the data to the sound/voice generator 45 (Step S121). The sound/voice generator 45 thus generates a sound/voice on the basis of the information data through the loudspeaker 45a. The controller 42 then determines whether the user operates the operation unit 46 to enter a cancellation command (Step S122). If it is determined at S122 that the cancellation command has not been entered, the controller 42 returns to Step S121 to repeat the sound/voice generation in accordance with the information data.

If it is determined at Step S117, S120 or S122 that the user operates the control unit 46 to issue the cancellation signal, the controller 42 exits the information output routine shown in FIG. 10 and returns to the main control routine (not shown).

As described above, as the vehicle terminal device 40 receives the information data from the information center 2, the information output routine shown in FIG. 10 is executed so that the vehicle terminal device 40 outputs the information content of the information data (by sound/voice and/or image). The manner of outputting the information content (by both sound/voice and image, or by image only, or by sound/voice only) can arbitrarily be decided by the user who operates the control unit 46.

Figure 11:
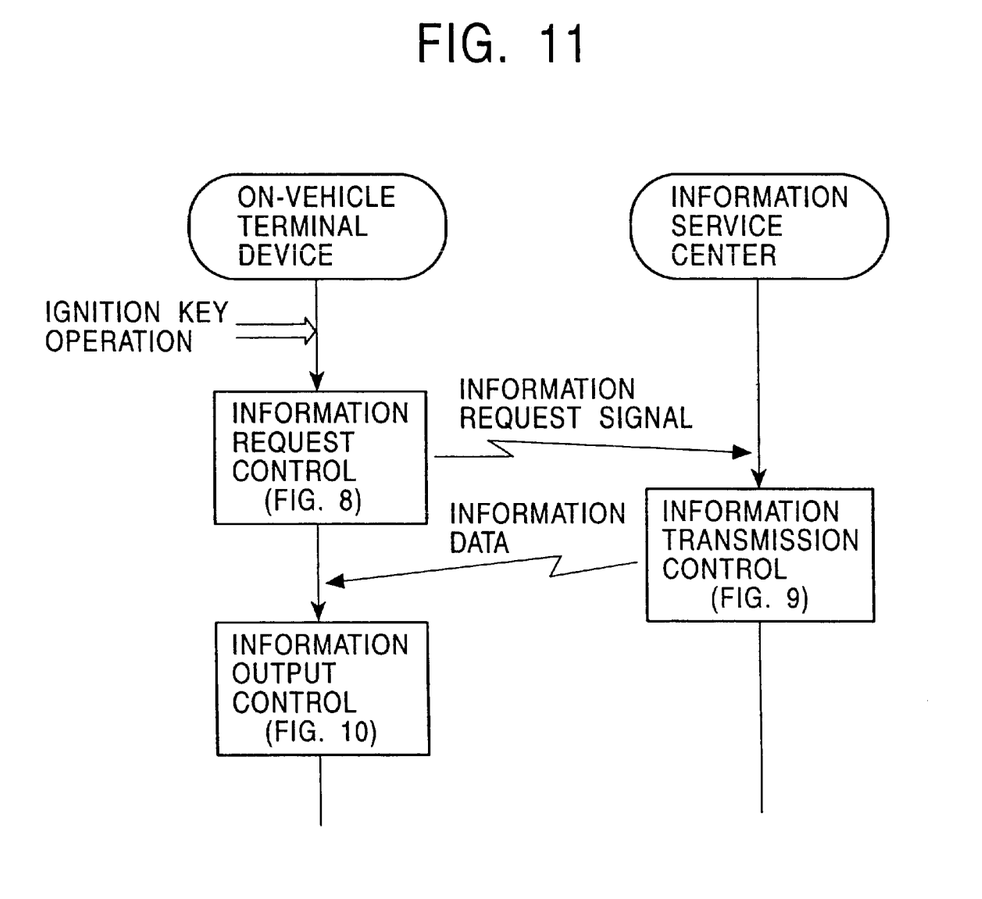
FIG. 11 illustrates a communication procedure between the on-vehicle terminal device and information service center.

Referring to FIG. 11, schematically illustrated is a communication procedure between the vehicle terminal device 40 and information service center 2 upon execution of the above described information request routine (FIG. 8), information transmission routine (FIG. 9) and information output routine (FIG. 10).

As illustrated in FIG. 11, the terminal device 40 of the vehicle transmits the information request signal to the information service center 2 in response to the key movement made by the driver who turns the ignition key 400a to start the vehicle 4. Upon receiving such information request signal, the service center 2 transmits the most recent information data in the genre desired by the information requesting party to the information requesting party (i.e., the on-vehicle terminal device 40). As the on-vehicle terminal device 40 receives such information data, the device 40 outputs the information data content in the form of image and/or sound/voice.

As understood from the above description, the information providing apparatus for the mobile body equipped with the engine according to the present invention makes it possible to automatically obtain the latest information in a particular genre which the driver wants to have (e.g., news, politics, economy, sports, entertainment, weather, etc.) in response to the driver's engine start operation. Further, in the present invention, the information obtaining procedure is performed only once in each of the first to third time periods (the first time period from 5 a.m. to 12 a.m., the second time period from 12 a.m. to 6 p.m. and the third time period from 6 p.m. to 5 a.m.) in response to the engine start operation(s). This saves an expense required for communication between the on-vehicle terminal device 40 and the information service center 2.

Although a day is divided into the three time periods (the first to third time periods) and the information obtaining operation is admitted only once in each of these time periods in the above described embodiment, the number of division of a day (or the number of the time periods) is not limited to three.

In addition, the start and end times of each of the time periods are not limited to the above mentioned ones (5 a.m. to 12 a.m. for the first time period, 12 a.m. to 6 p.m. for the second time period, and 6 p.m. to 5 a.m. for the third time period), but can arbitrarily be changed as the information service center 2 demands (to make them suit the convenience of the information service center 2).

Figure 12:
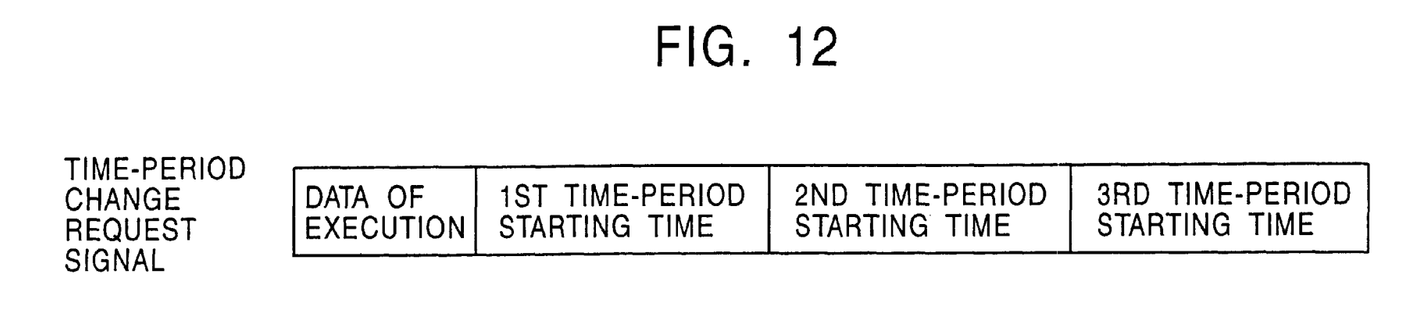
FIG. 12 illustrates a format of a request signal for changing time periods.

For example, when the start and end times of the time periods should be changed, the information service center 2 sends a time-period change request signal that includes date-of-execution information specifying a date of changing the time periods and start time information specifying the new start times of the respective time periods, as shown in FIG. 12, to each of the on-vehicle terminal devices 40. Upon receiving the time-period change request signal, each on-vehicle terminal device 40 stores the start time information and date-of-execution information in a predetermined area of the memory 43. After receiving the time-period change request signal, the controller 42 of the on-vehicle terminal device 40 executes a time-period change routine shown in FIG. 13 when the current time represented by the date and time information DT supplied from the date and time clock 41 becomes 0:00 a.m.

Figure 13:
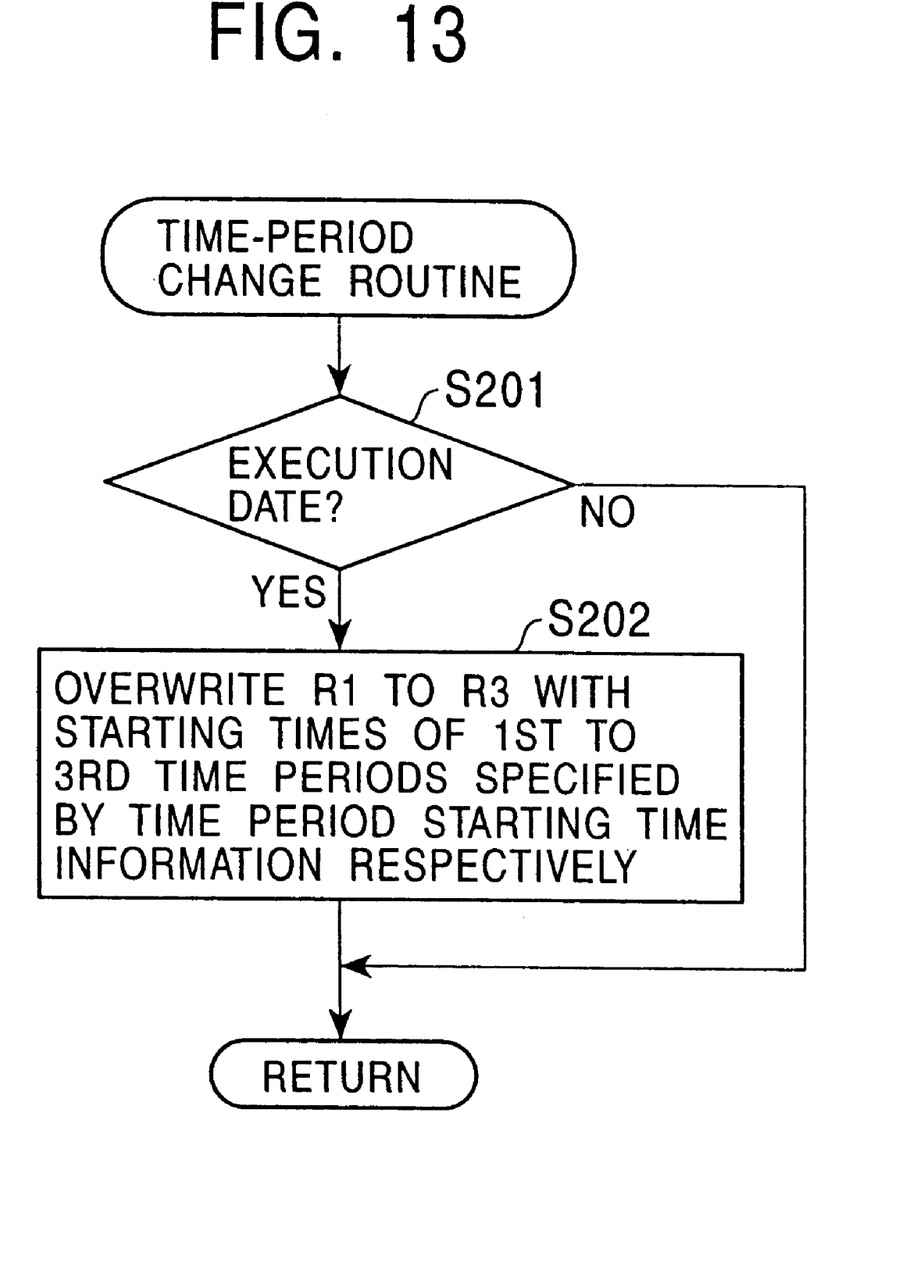
FIG. 13 illustrates a control routine for changing the time periods.

Referring to FIG. 13, the controller 42 first determines whether the today's date represented by the date and time information DT is the execution date specified by the date-of-execution information (Step S201). If it is determined at Step S201 that the today's date is the execution date, the controller 42 writes the new start times of the first to third time periods specified by the start time information over the start times in the first to third time-period registers R1 to R3, respectively (Step S202). After Step S202, or if it is determined at Step S201 that the today's date is not the execution date specified by the date-of-execution information, the controller 42 exits the time-period change routine and returns to the main control routine.

This time-period change routine changes the respective time periods to the specified new periods in the on-vehicle terminal device 40 in response to the time-period change request signal from the information service center 2

Although the information sources to provide the on-vehicle terminal device 40 with various information are the sites on the Internet in the above embodiments, the present invention is not limited in this regard. For instance, the information source may be a communication enterprise that distributes information by wireless.

As described above, the information providing apparatus for the mobile body equipped with the engine according to the present invention automatically causes the information service center to provide the mobile body with the latest information in a particular genre desired by a driver in response to the engine starting operation.

Accordingly, the present invention allows the driver to easily obtain the desired information without being bothered by a troublesome operation, such as making a request for information transmission, in addition to the car driving operation.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2000-318268 which is hereby incorporated by reference.

What is claimed is:

1. An information providing apparatus for providing mobile bodies with various information data, each of the mobile bodies having an engine, the information providing apparatus comprising:

a terminal device provided in each of the mobile bodies for transmitting an information request signal in response to an operation of starting the engine of the mobile body; and an information providing device for transmitting information data to the terminal device of the mobile body upon receiving the information request signal, wherein the terminal device of the mobile body transmits the information request signal only in response to the first time the engine is started within each of a plurality of predetermined time periods of a day.

2. The information providing apparatus according to claim 1, wherein the terminal device of the mobile body includes an information output device for receiving the information data from the information providing device and outputting a content of the information data by at least one of voice, sound and image.

3. The information providing apparatus according to claim 1, wherein the information providing device includes:

a memory for storing genre information representing the respective genres of the information data desired by the terminal devices of the respective mobile bodies;

an information obtaining portion for obtaining information data related to the respective genres from an information source and storing it in the memory; and an information transmission portion for reading from the memory, in response to the information request signal, the genre that corresponds to the terminal device of the mobile body which has sent the information request signal, retrieving the information data only related to the read genre from the memory and transmitting the retrieved data to the terminal device of the mobile body.

4. An information providing method for providing mobile bodies with various information data, each of the mobile bodies having an engine, the information providing method comprising the steps of:

making a request for information in response to an operation of starting the engine of the mobile body; and transmitting information data to a terminal device of the mobile body in response to the information request, wherein the step of making a request for information makes a request for information only in response to the first time the engine is started within each of a plurality of predetermined time periods of a day.

5. The information providing method according to claim 4 further including the step of receiving the information data and outputting a content of the information data by at least one of voice, sound and image.

6. The information providing method according to claim 4, wherein the step of transmitting information data transmits to the mobile body which has made the information request the information data only related to a genre desired by the mobile body which has made the information request.

7. An information providing apparatus for providing a mobile body with various information data, the mobile body having an engine, the information providing apparatus comprising:

a terminal device provided in the mobile body for transmitting an information request signal in response to an operation of starting the engine of the mobile body; and an information providing device for transmitting information data to the terminal device of the mobile body upon receiving the information request signal, wherein the terminal device of the mobile body transmits the information request signal only in response to the first time the engine is started within each of a plurality of predetermined time periods of a day.

8. The information providing apparatus according to claim 7, wherein the terminal device of the mobile body includes an information output device for receiving the information data from the information providing device and outputting a content of the information data by at least one of voice, sound and image.

9. The information providing apparatus according to claim 7, wherein the information providing device includes:

a memory for storing genre information representing the genre of the information data desired by the terminal device of the mobile body;

an information obtaining portion for obtaining information data related to the genre from an information source and storing it in the memory; and an information transmission portion for reading from the memory, in response to the information request signal, the genre of the information data desired by the terminal device, retrieving the information data related to the read genre from the memory and transmitting the retrieved data to the terminal device.

* * * * *